US008851759B2

(12) United States Patent
Bussit et al.

(10) Patent No.: US 8,851,759 B2
(45) Date of Patent: Oct. 7, 2014

(54) ROLLING BEARING FOR POWER STEERING MECHANISM

(71) Applicants: Sylvain Bussit, Monnaie (FR); Daniel Jansen, Tours (FR); Thomas Lepine, Villandry (FR); Bruno Montboeuf, Cerelles (FR)

(72) Inventors: Sylvain Bussit, Monnaie (FR); Daniel Jansen, Tours (FR); Thomas Lepine, Villandry (FR); Bruno Montboeuf, Cerelles (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/868,778

(22) Filed: Apr. 23, 2013

(65) Prior Publication Data
US 2013/0279837 A1 Oct. 24, 2013

(30) Foreign Application Priority Data

Apr. 23, 2012 (FR) ...................................... 1253676

(51) Int. Cl.
*F16C 27/00* (2006.01)
*F16C 27/06* (2006.01)
*F16C 19/06* (2006.01)
*F16C 35/077* (2006.01)

(52) U.S. Cl.
CPC .............. *F16C 19/06* (2013.01); *F16C 27/066* (2013.01); *F16C 2326/24* (2013.01); *F16C 35/077* (2013.01)

USPC .......................................... 384/536; 384/582

(58) Field of Classification Search
USPC .......................... 384/535, 536, 563, 581, 582
See application file for complete search history.

(56) References Cited

U.S. PATENT DOCUMENTS

| | | | | |
|---|---|---|---|---|
| 2,826,464 | A * | 3/1958 | Hawk, Sr. et al. | 384/536 |
| 3,415,500 | A * | 12/1968 | Pethis | 261/29 |
| 4,017,128 | A | 4/1977 | Setele et al. | |
| 6,939,052 | B1 * | 9/2005 | Hull | 384/535 |
| 7,637,667 | B1 | 12/2009 | Schaub | |

FOREIGN PATENT DOCUMENTS

| | | |
|---|---|---|
| DE | 10053183 A1 | 6/2001 |
| DE | 102005007986 A1 | 8/2006 |
| FR | 2816999 A1 | 5/2002 |
| GB | 528648 A | 11/1940 |

* cited by examiner

*Primary Examiner* — Phillip A Johnson
(74) *Attorney, Agent, or Firm* — Bryan Peckjian; SKF USA Inc. Patent Department

(57) ABSTRACT

The rolling bearing, in particular for a power steering mechanism, comprises an inner ring, an outer ring, an elastic sleeve in contact axially and radially with one of said rings, and a housing holding the sleeve. The housing provides an axial portion and two lateral flanges extending the axial portion and mounted in contact against the sleeve to exert an axial prestress on said sleeve.

10 Claims, 3 Drawing Sheets

ROLLING BEARING FOR POWER STEERING MECHANISM

CROSS-REFERENCE TO RELATED APPLICATIONS

This application claims priority to French patent application no. 1253676, filed Apr. 23, 2012, the contents of which are fully herein incorporated by reference.

FIELD OF THE INVENTION

The present invention relates to the field of rolling bearings, in particular those used in power steering mechanisms for motor vehicles.

BACKGROUND OF THE INVENTION

A power steering mechanism comprises an electric assisting steering motor and a worm screw mounted on an output shaft of said motor and meshing with a toothed wheel for example fastened to the shaft of the steering column or connected to the steering rack via an intermediate pinion.

Generally, the power steering mechanism also comprises a system for automatically compensating the wear of the thread or threads of the worm screw and/or of the teeth of the associated toothed wheel that can occur over time. For more details, reference can, for example, be made to the document DE-A1-100 53 183 illustrating such a wear compensation system.

In this document, the wear compensation system is mounted at one end of the worm screw, the other end of the screw being mounted to rotate inside a housing via a rolling bearing. Between the bearing and the housing, there is arranged a metal tolerance ring allowing a radial displacement of said bearing and of the worm screw towards the toothed wheel in a wear compensation action.

This solution presents the drawback of not making it possible to absorb an angular alignment defect of the axis of the worm screw and of the axis of the housing, in particular in a wear compensation action. Moreover, it is necessary to provide for two distinct elements to be mounted, namely the metal tolerance ring and the rolling bearing.

The present invention aims to remedy these drawbacks.

SUMMARY OF THE INVENTION

More particularly, the present invention aims to provide a rolling bearing, in particular for a power steering mechanism, that is easy to manufacture, and to mount, that exhibits a good axial rigidity and that can adapt to the angular alignment defects of the axis of the shaft on which the bearing is mounted and of the axis of the associated housing.

In one embodiment, the rolling bearing, in particular for a power steering mechanism, comprises an inner ring, an outer ring, an elastic sleeve in contact axially and radially with one of said rings, and a housing holding the sleeve. The housing comprises an axial portion and two lateral flanges extending the axial portion and mounted in contact against the sleeve to exert an axial prestress on said sleeve.

In one embodiment, at least one of the lateral flanges of the housing is curved inwards towards the sleeve. The two lateral flanges of the housing can be curved inwards towards the sleeve.

In one embodiment, the bearing comprises at least one row of rolling elements arranged between said rings. Preferably, each ring of the rolling bearing is solid and comprises at least one concave raceway for the rolling elements.

In one embodiment, the sleeve comprises an axial portion and two radial portions each arranged at an end of the axial portion. Each radial portion of the sleeve can be enclosed axially between said ring and the associated lateral flange of the housing. The axial portion of the sleeve is advantageously arranged radially between the axial portion of the housing and a cylindrical surface of said ring.

Preferably, the sleeve delimits, together with the housing, at least one free space. The sleeve can comprise a plurality of protrusions in contact with the housing.

The invention also relates to a power steering mechanism for a motor vehicle comprising a rolling bearing as defined previously.

BRIEF DESCRIPTION OF THE DRAWINGS

The present invention will be better understood on studying the detailed description of an embodiment taken as a nonlimiting example and illustrated by the appended drawings, in which.

DETAILED DESCRIPTION OF THE INVENTION

Figure 1:
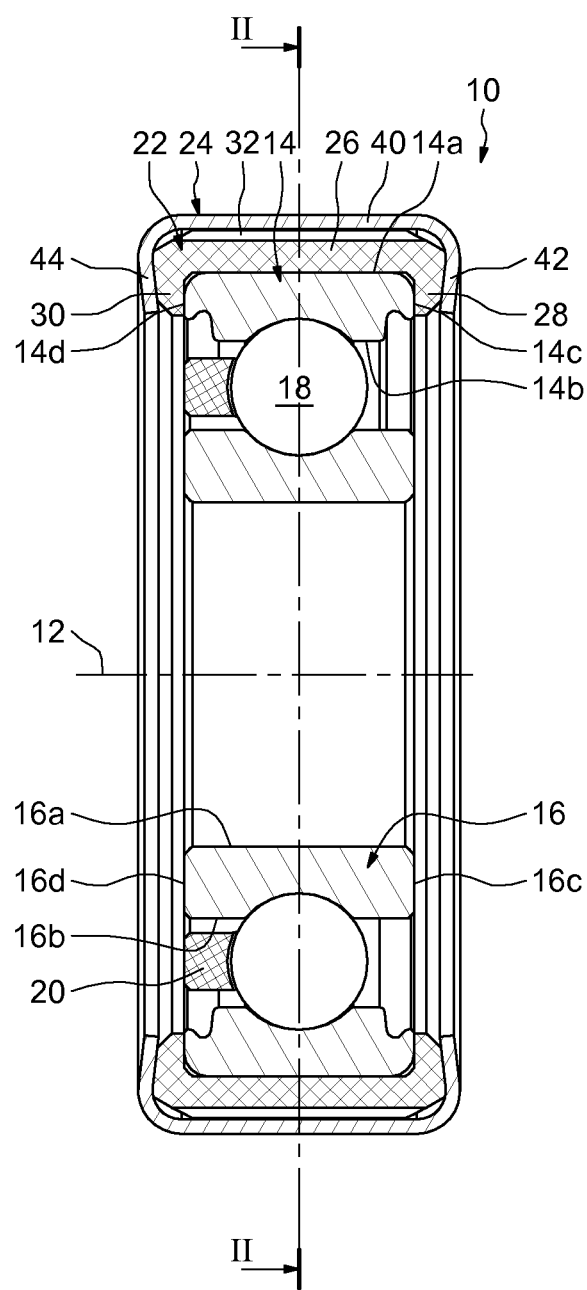
FIG. 1 is an axial cross-sectional view of a rolling bearing according to one example of the invention.
Figure 2:
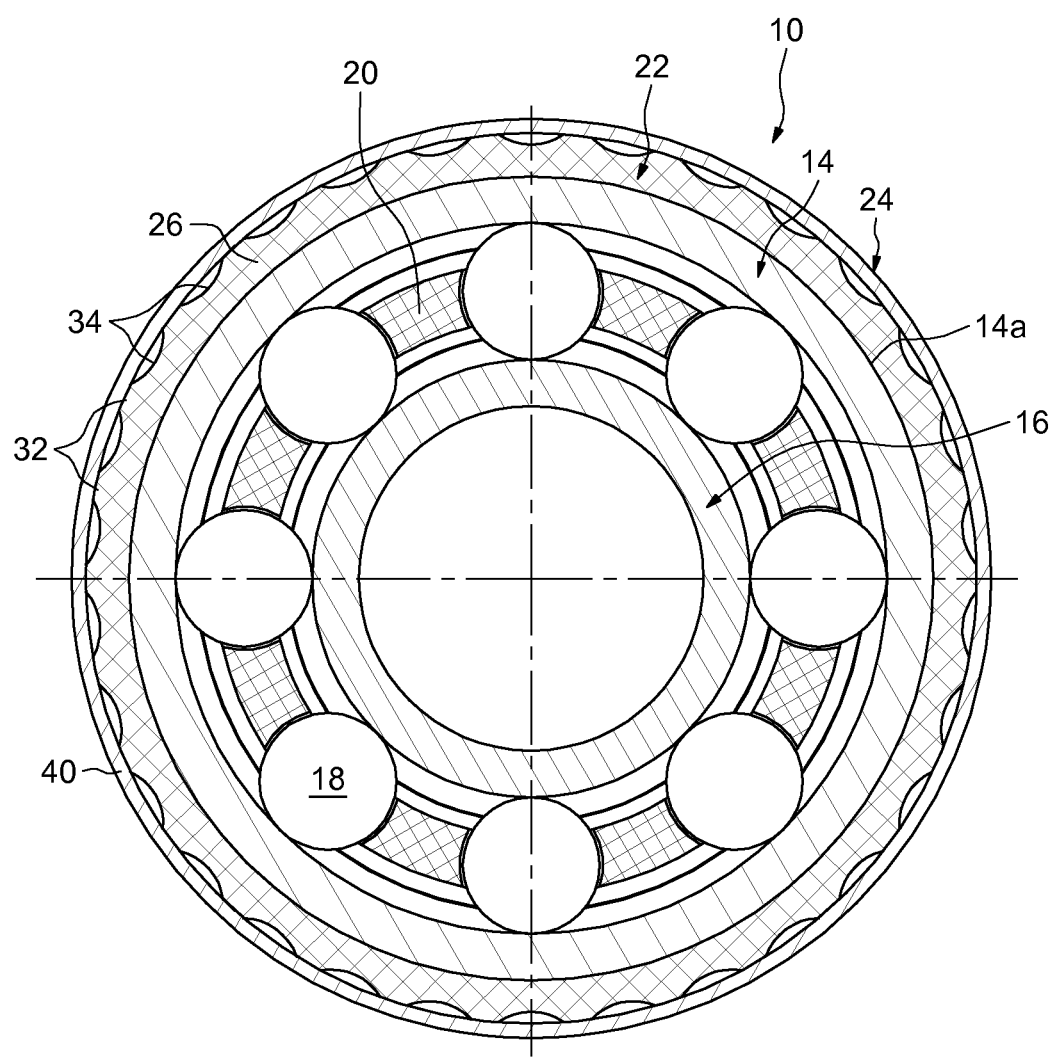
FIG. 2 is a cross-sectional view along the axis II-II of FIG. 1.
Figure 3:
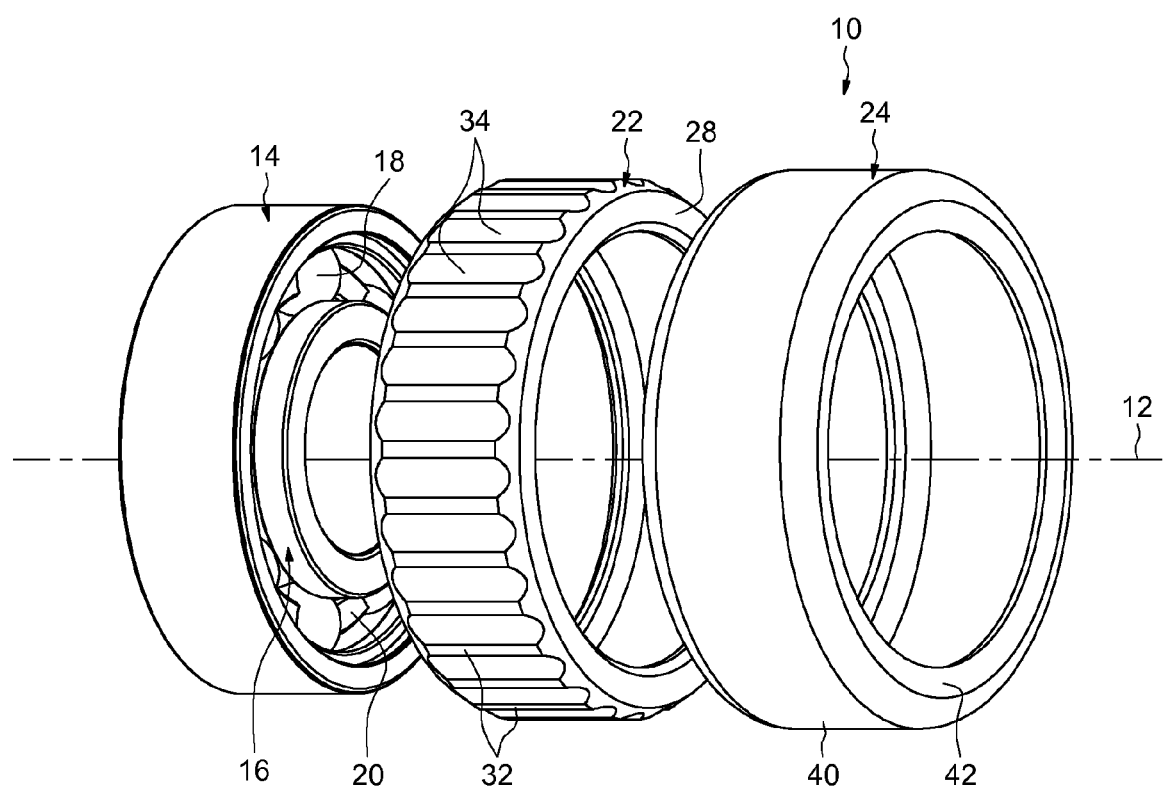
FIG. 3 is an exploded perspective view of the bearing of FIGS. 1 and 2.

In FIGS. 1 to 3, a rolling bearing 10, of axis 12, comprises an outer ring 14, an inner ring 16, a plurality of rolling elements 18, here produced in the form of balls, a cage 20 for maintaining the regular circumferential spacing of the rolling elements, an elastic sleeve 22 mounted on the outer ring and a housing 24 holding said sleeve.

The outer ring 14 comprises a cylindrical axial outer surface 14a, a staged bore 14b, two opposing radial frontal surfaces 14c and 14d, and a deep-grooved raceway formed substantially in the middle of the bore 14b and exhibiting, in cross section, a concave internal profile matched to the rolling elements 18, said raceway being directed radially inwards.

The inner ring 16 comprises a cylindrical bore 16a, a cylindrical axial outer surface 16b, two opposing radial frontal surfaces 16c and 16d, and a deep-grooved raceway formed substantially in the middle of the outer surface 16b and exhibiting, in cross section, a concave internal profile matched to the rolling elements 18, said raceway being directed radially outwards. The frontal surface 16c, 16d is respectively situated in a radial plane containing the frontal surface 14c, 14d of the inner ring.

The outer 14 and inner 16 rings are solid. The expression "solid ring" should be understood to mean a ring whose shape is obtained by machining with removal of chippings (turning, grinding) from tubes, bars, forged and/or rolled preforms.

The sleeve 22 can, for example, be made of elastic synthetic material such as an elastomer or a rubber. The sleeve 22 is securely attached to the outer ring 10. It can, for example, be overmoulded on the outer ring 10 or be fastened by any other appropriate means, for example by gluing.

The sleeve 22 is of a single piece and of annular form with a U section. The sleeve 22 is in contact axially and radially with the outer ring 14. The sleeve 22 comprises an annular axial portion 26 and two annular radial portions 28, 30 arranged at the opposite ends of the axial portion 26 and directed radially inwards. The two annular radial portions of the elastic sleeve cover all of the two radial frontal surfaces of the outer ring, and, the annular axial portion of the elastic sleeve covers all of the cylindrical axial outer surface of the outer ring. In the exemplary embodiment illustrated, the radial portions 28, 30 are symmetrical to one another relative to a radial median plane of the bearing passing through the centre of the rolling elements 18. The axial portion 26 is in radial contact with the outer surface 14a of the outer ring and surrounds it radially. The radial portions 28, 30 are in axial contact with the radial surfaces 14c, 14d of the outer ring 10.

The outer surface of the axial portion 26 is provided with a plurality of teeth 32 which, in the exemplary embodiment illustrated, are axially oriented. The teeth 32 are spaced apart from one another in the circumferential direction. Between two successive teeth 32, there is formed a free space 34. A plurality of free spaces 34 are delimited by the teeth 32 and spaced apart from one another regularly in the circumferential direction. The teeth 32 can be deformed by being crushed under the effect of a radial force and by at least partly filling the free spaces 34. The material of the sleeve 22 is elastic but not compressible and the free spaces 34 confer upon the sleeve 22 a good deformation capability which can be predetermined by varying the form and the volume of each free space delimited between two successive teeth 32. As indicated previously, in the exemplary embodiment illustrated, the sleeve 22 comprises, on its outer surface, a plurality of protrusions formed by the teeth 32. As a variant, it could be possible to provide, on the outer surface of the axial portion 26, a plurality of protruding studs of a form that is for example circular with a transversal section which can be rectangular, trapezoidal, rounded or not, etc. In this case, the studs define between them free spaces in which they can be deformed under the effect of a radial force.

The holding housing 24 can advantageously be produced economically from a sheet metal flank by cutting and stamping. The housing 24 is of a single piece and of annular form with a U section. The housing 24 is continuous in the circumferential direction. The housing 24 is in contact axially and radially with the sleeve 22. The housing 24 comprises an annular cylindrical axial portion 40 and two annular lateral edges or flanges 42, 44 each arranged at an end of the axial portion 40 and being extended radially inwards. The two lateral flanges of the housing cover all of the two annular radial portions of the elastic sleeve, Further, an angle between at least one lateral flange and the axial portion of the housing is less than nintey (90)degrees. The axial portion 26 of the sleeve is situated radially between the outer surface 14a of the outer ring and the axial portion 40 of the housing. The bore of the axial portion 40 of the housing is in radial contact with the teeth 32 of the axial portion 26 of the sleeve and surrounds it radially. The free spaces 34 formed between the teeth 32 of the sleeve are closed radially by the bore of the axial portion 40. The free spaces 34 are delimited by the sleeve 22 and the housing 24.

The lateral flange 42, 44 of the housing is in contact with the radial portion 28, 30 of the sleeve axially on the side opposite the radial surface 14c, 14d of the outer ring 10. Each lateral flange 42, 44 is curved axially inwards towards the associated radial portion 28, 30 of the sleeve, such that the lateral flanges are askew with the two radial frontal surfaces of the outer ring, so as to exert an axial prestress on the sleeve. This axial prestress exerted on the sleeve 22 makes it possible to avoid the existence of play between the outer ring 14, the sleeve 22 and the housing 24. Furthermore, the overall axial rigidity of the rolling bearing 10 is enhanced. Each radial portion 28, 30 of the sleeve is enclosed axially between the associated lateral flange 42, 44 of the housing and the outer ring 10. The radial portion 28, 30 is in axial direct contact against the radial surface 14c, 14d of the outer ring 10 and in axial direct contact against the lateral flange 42, 44 of the housing. Said lateral flanges 42, 44 of the housing are axially in direct contact against the sleeve 22.

In the exemplary embodiment illustrated, the lateral flanges 42, 44 are symmetrical to one another relative to the radial median plane of the bearing passing through the centre of the rolling elements 18. As a variant, only one of the lateral flanges 42, 44 could be curved axially inwards towards the associated radial portion 28, 30 of the sleeve so as to be extended obliquely, the other flange being able to be extended purely radially.

The outer surface of the housing 24 is designed to be arranged inside a housing and the inner ring 16 to be mounted on a rotating shaft, in particular on the worm screw associated with the power electric motor when the rolling bearing 10 is being used in a power steering mechanism.

In FIG. 1, the rolling bearing 10 is represented in a position with no angular misalignment in which the axis 12 of the inner ring 16 and of the associated shaft is identical to the axis of the holding housing 24 and of the associated housing.

When the axis 12 of the inner ring 16 is tilted angularly relative to the axis of the housing 24, which can for example occur in an automatic wear compensation action in a use of the bearing in a power steering mechanism, there occurs first a slight pivoting of the outer ring 14 relative to the inner ring 16. This pivoting is made possible by virtue of the use of solid outer 14 and inner 16 rings with concave raceways. Then, the elastic sleeve 22 is deformed to absorb the angular misalignment. The teeth 32 of the sleeve are slightly crushed on the side of the radial portion 28, or 30, of the sleeve, which causes a compression of said radial portion and a slight expansion of the other radial portion. With such a rolling bearing provided with a deformable elastic sleeve and comprising solid rings, the angular tilting of the axis of the inner ring 16 relative to the axis of the housing 24 can, for example, be of the order of 5°.

Furthermore, even with such a deformation of the sleeve 22, the bearing 10 retains a good axial rigidity by virtue of the axial prestress exerted by the lateral flanges 42, 44 of the housing.

Moreover, the sleeve 22 can also allow a radial displacement of the housing 24 relative to the outer ring 14.

In the exemplary embodiment illustrated, the deformable sleeve 22 is arranged in the annular space provided between the holding housing 24 and the outer ring 14 while leaving a portion of this space free in order to obtain an easy deformation of the sleeve. As a variant, it could be possible to provide a sleeve that entirely fills the annular space provided between the holding housing 24 and the outer ring 14. In this case, the angular tilting allowed by the bearing is more limited and depends mainly on the nature of the elastic material used for the sleeve.

In the exemplary embodiment illustrated, the sleeve and the housing are mounted on the outer ring. As a variant, it could be possible to mount the sleeve in the cylindrical bore of the inner ring and to arrange the holding housing in the bore of the sleeve. In the exemplary embodiment illustrated, the bearing is a rolling bearing. Alternatively, the bearing could be a sliding bearing comprising two rings mounted radially pressing against one another. However, in this case, the angular tilt capacity of the axis of the inner ring relative to the axis of the housing is reduced compared to that of a rolling bearing comprising solid rings with concave raceways for the rolling elements.

The invention claimed is:

1. A rolling bearing for a power steering mechanism, the rolling bearing comprising:
   an inner ring, and
   an outer ring having two radial frontal surfaces and a cylindrical axial outer surface;
   an elastic sleeve having an annular axial portion and two annular radial portions extending therefrom such that the elastic sleeve is in contact axially and radially with the outer ring such that the two annular radial portions of the elastic sleeve cover all of the two radial frontal surfaces of the outer ring and such that the annular axial portion of the elastic sleeve covers all of the cylindrical axial outer surface of the outer ring, and
   a housing holding the sleeve therein, the housing having an axial portion and two lateral flanges extending from the axial portion, the two lateral flanges of the housing covering all of the two annular radial portions of the elastic sleeve, the two lateral flanges being configured to contact the elastic sleeve and exert an axial pre-stress on the elastic sleeve, wherein at least one of the lateral flanges of the housing is curved radially inwards towards the elastic sleeve such that the at least one of the lateral flanges is askew with the two radial frontal surfaces of the outer ring.

2. The rolling bearing according to claim 1, wherein an angle between the at least one lateral flange and the axial portion of the housing is less than ninety (90) degrees.

3. The rolling bearing according to claim 1, wherein the two lateral flanges of the housing are curved inwards towards the elastic sleeve.

4. The rolling bearing according to claim 1, further comprising at least one row of rolling elements arranged between said rings.

5. The rolling bearing according to claim 4, wherein each ring is solid and includes at least one concave raceway for the rolling elements.

6. The rolling bearing according to claim 1, wherein each annular radial portion of the elastic sleeve is enclosed axially between the outer ring and one of the two lateral flanges.

7. The rolling bearing according to claim 1, wherein the annular axial portion of the elastic sleeve is arranged radially between the axial portion of the housing and the cylindrical axial outer surface of the outer ring.

8. The rolling bearing according to claim 1, wherein the elastic sleeve delimits, together with the housing, at least one free space.

9. The rolling bearing according to claim 1, wherein the elastic sleeve further comprises a plurality of protrusions in contact with the housing.

10. A power steering mechanism for a motor vehicle, comprising:
    a rolling bearing having;
    an inner ring, and
    an outer ring having two radial frontal surfaces and a cylindrical axial outer surface;
    an elastic sleeve having an annular axial portion and two annular radial portions extending therefrom such that the elastic sleeve is in contact axially and radially with the outer ring such that the two annular radial portions of the elastic sleeve cover all of the two radial frontal surfaces of the outer ring and such that the annular axial portion of the elastic sleeve covers all of the cylindrical axial outer surface of the outer ring, and
    a housing holding the sleeve therein, the housing having an axial portion and two lateral flanges extending from the axial portion, the two lateral flanges of the housing covering all of the two annular radial portions of the elastic sleeve, the two lateral flanges being configured to contact the elastic sleeve and exert an axial pre-stress on the elastic sleeve, wherein at least one of the lateral flanges of the housing is curved radially inwards towards the elastic sleeve such that the at least one of the lateral flanges is askew with the two radial frontal surfaces of the outer ring.

* * * * *